United States Patent [19]
Wallace

[11] Patent Number: 5,324,907
[45] Date of Patent: Jun. 28, 1994

[54] EDM APPARATUS WITH A CAM ARM FOR MOVING AN ELECTRODE

[75] Inventor: Kenneth R. Wallace, Forest, Va.

[73] Assignee: B&W Nuclear Service Company, Lynchburg, Va.

[21] Appl. No.: 115,613

[22] Filed: Sep. 3, 1993

[51] Int. Cl.⁵ .............................................. B23H 7/30
[52] U.S. Cl. .................................. 219/69.2; 219/69.15
[58] Field of Search .................. 219/69.2, 69.15, 69.17

[56] References Cited

U.S. PATENT DOCUMENTS

| | | | |
|---|---|---|---|
| 3,333,080 | 7/1967 | De Vries | 219/69.17 |
| 4,104,503 | 8/1978 | Di Piazza et al. | 219/69.15 |
| 4,135,070 | 1/1979 | Pfau et al. | 219/69.17 |
| 4,430,544 | 2/1984 | Inoue | 219/69.2 |
| 4,476,368 | 10/1984 | Cammann et al. | 219/69.15 |
| 4,900,890 | 2/1990 | Masaki et al. | 219/69.17 |
| 4,948,933 | 8/1990 | Thompson | 219/69.2 |

FOREIGN PATENT DOCUMENTS

| | | | |
|---|---|---|---|
| 30886 | 6/1981 | European Pat. Off. | 219/69.2 |
| 62-24922 | 2/1987 | Japan | 219/69.2 |
| 63-123634 | 5/1988 | Japan | 219/69.2 |

Primary Examiner—Geoffrey S. Evans
Attorney, Agent, or Firm—Robert J. Edwards; D. Neil LaHaye

[57] ABSTRACT

A support base has adjustable slides mounted thereon. A cam arm is mounted at one end on a piston rod that is used to cause vertical movement of the cam arm. The opposing end of the cam arm has a bore that rotatably receives a sleeve therein. An electrode holder is pivotally mounted in the sleeve such that one end of the electrode holder extends beyond the end of the sleeve. The electrode holder is movable between a first normal working position and a second non working position that corresponds to movement of the cam arm. A drive motor and belt are engaged with the sleeve to cause rotation of the sleeve, electrode holder, and electrode to perform machining operations on a workpiece that the electrode is inserted into.

2 Claims, 3 Drawing Sheets

EDM APPARATUS WITH A CAM ARM FOR MOVING AN ELECTRODE

BACKGROUND OF THE INVENTION

1. Field of the Invention

The present invention is generally related to the machining of cylindrical parts and particularly to electrical discharge machining of grooves in cylindrical parts.

2. General Background

In some industries it is required that tubular members have one or more grooves around the inner or outer diameter of the tubular members. Patents directed to the use of electric discharge machining (EDM) or some type of erosion for cutting members or forming notches or grooves that applicant is aware of include the following.

U.S. Pat. No. 4,948,933 discloses a portable electrode arc cutting tool that is releasably attachable to the work surface for cutting an internal or external precision depth notch in the work surface. The electrode member extends over a distance equal to the length of the notch to be formed. The depth of the notch is controlled by a calibrated feed control that limits the radial movement of the electrode.

U.S Pat. No. 4,476,368 discloses a metal tube wall disintegrator where the electrode moves in a path that mechanically opens and closes the circuit by alternately contacting and retracting the electrode from the work piece to produce the electrical spark erosion.

U.S. Pat. No. 4,203,018 discloses an electrode mounted on horizontal slides fed outward with a cam mechanism. U.S. Pat. No. 4,104,503 discloses an apparatus for electroerosion within a solid component where two linkage members slide relative to each other to rotate the electrode into the work.

U.S. Pat. No. 4,100,388 discloses an electroerosion method and apparatus where two electrodes are used, with the path of one electrode intersecting that of the other electrode to create a dovetail channel.

The known art of electrical discharge machining leaves a need for an apparatus capable of providing a circumferential groove around the interior or exterior diameter of a tubular member.

SUMMARY OF THE INVENTION

The present invention addresses the above need in a straightforward manner. What is provided is an electrical discharge machining apparatus that utilizes an electrode mounted on a moving electrode holder. An electrode is mounted at one end of an arm or electrode holder. The electrode holder is pivotally mounted near its midsection on a pivot pin that is received through a sleeve. The sleeve is rotatably received in a cam arm that is arranged to be selectively movable along a portion of the length of the sleeve. The cam arm is attached to and moved vertically by a support base. The sleeve is engaged with a drive motor for causing rotation of the sleeve and electrode. Vertical movement of the cam arm toward the electrode causes pivoting of the electrode to a working position toward the tubular work piece that is to be grooved or cut. Movement of the cam arm in the opposite direction allows movement of the electrode to a normal nonworking position for placement or removal of the apparatus. A spring in the sleeve bears against the electrode holder to cause the electrode to move away from the work piece to its normal nonworking position. The sleeve is rotated to cause corresponding rotation of the electrode to form a circumferential groove in or to cut the work piece.

BRIEF DESCRIPTION OF THE DRAWINGS

For a further understanding of the nature and objects of the present invention, reference should be had to the following description, taken in conjunction with the accompanying drawings in which like parts are given like reference numerals, and wherein.

DETAILED DESCRIPTION OF THE PREFERRED EMBODIMENT

Figure 1:
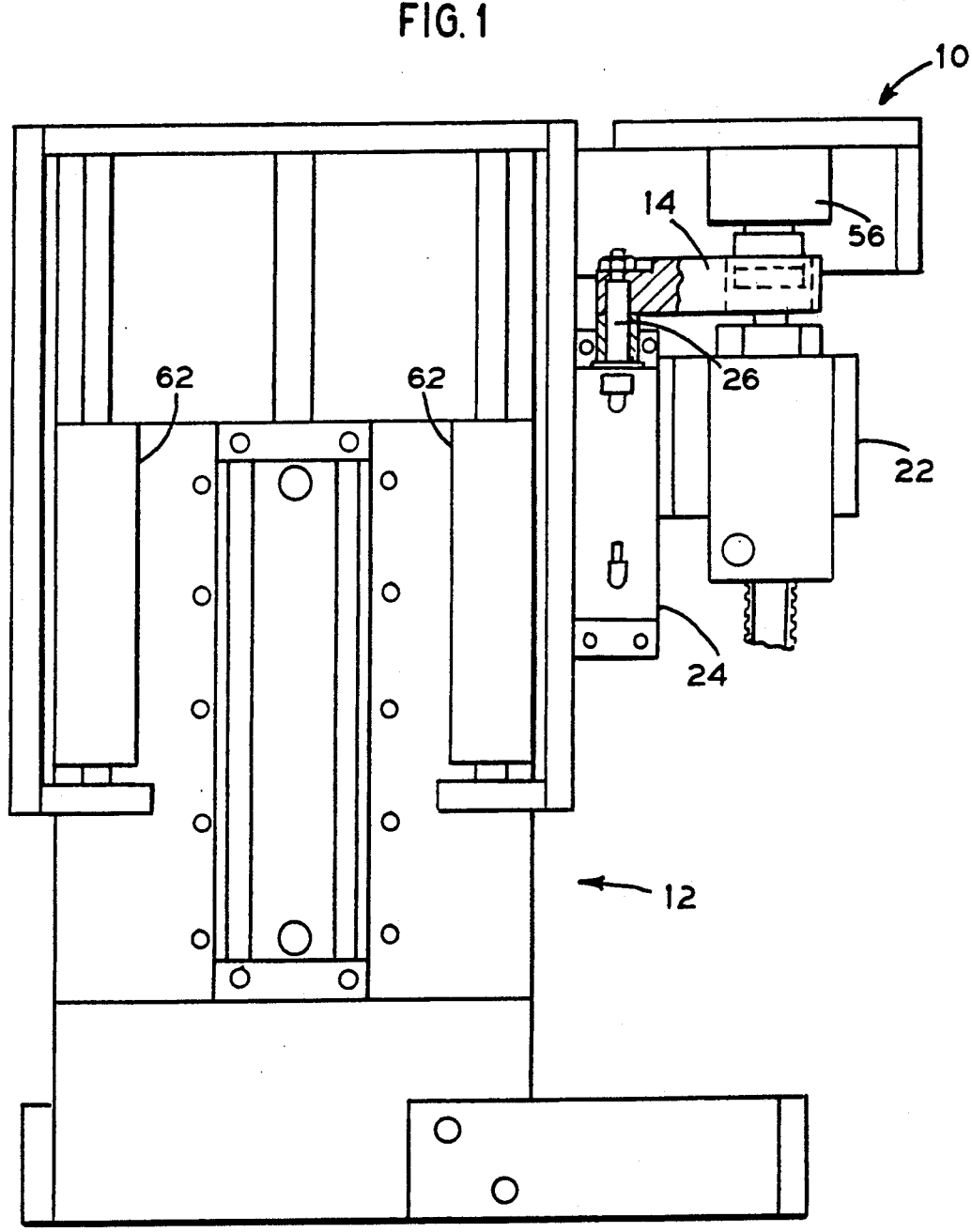
FIG. 1 is a side and partial section view of the invention.
Figure 2:
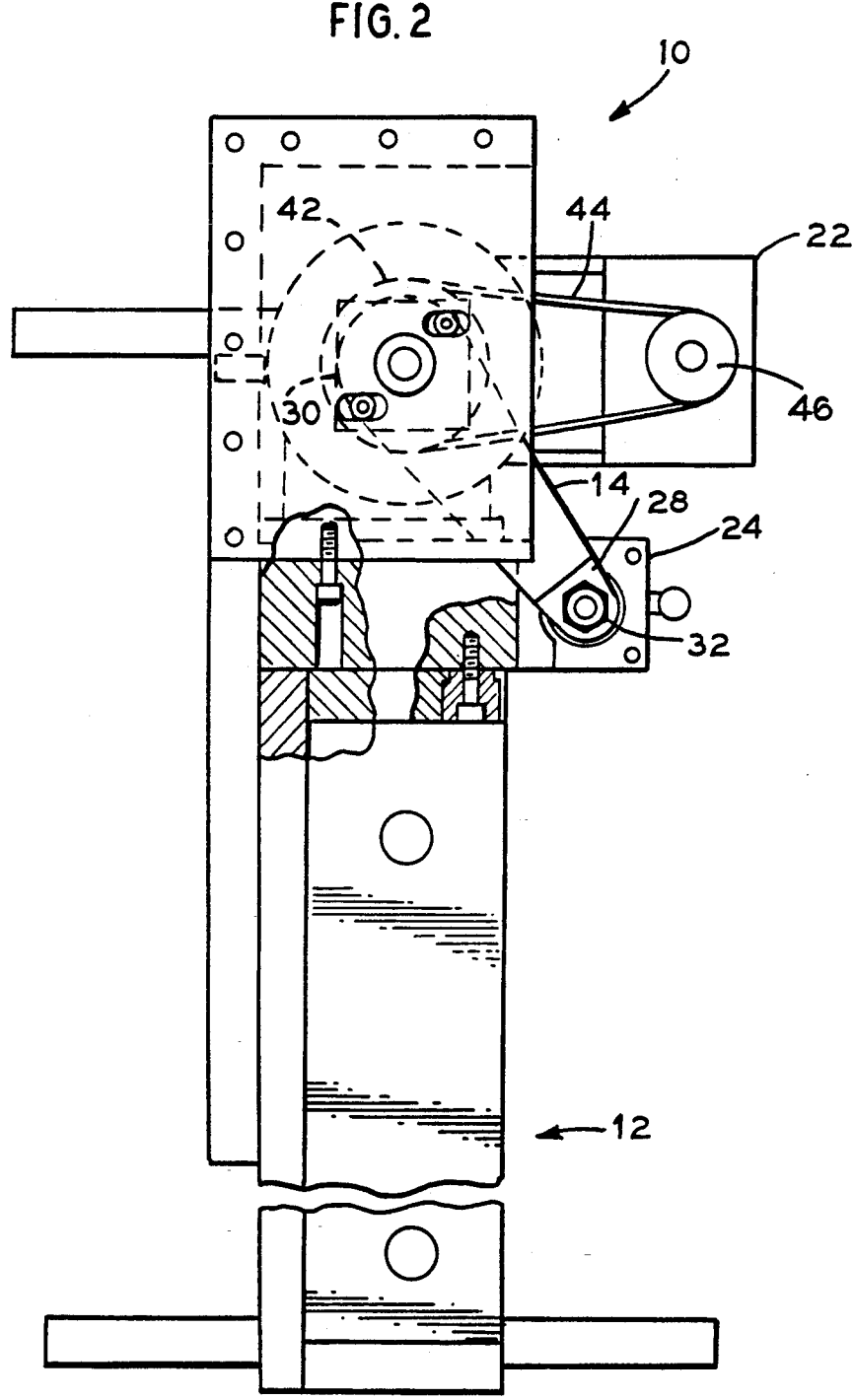
FIG. 2 is a top view of the invention.
Figure 3:
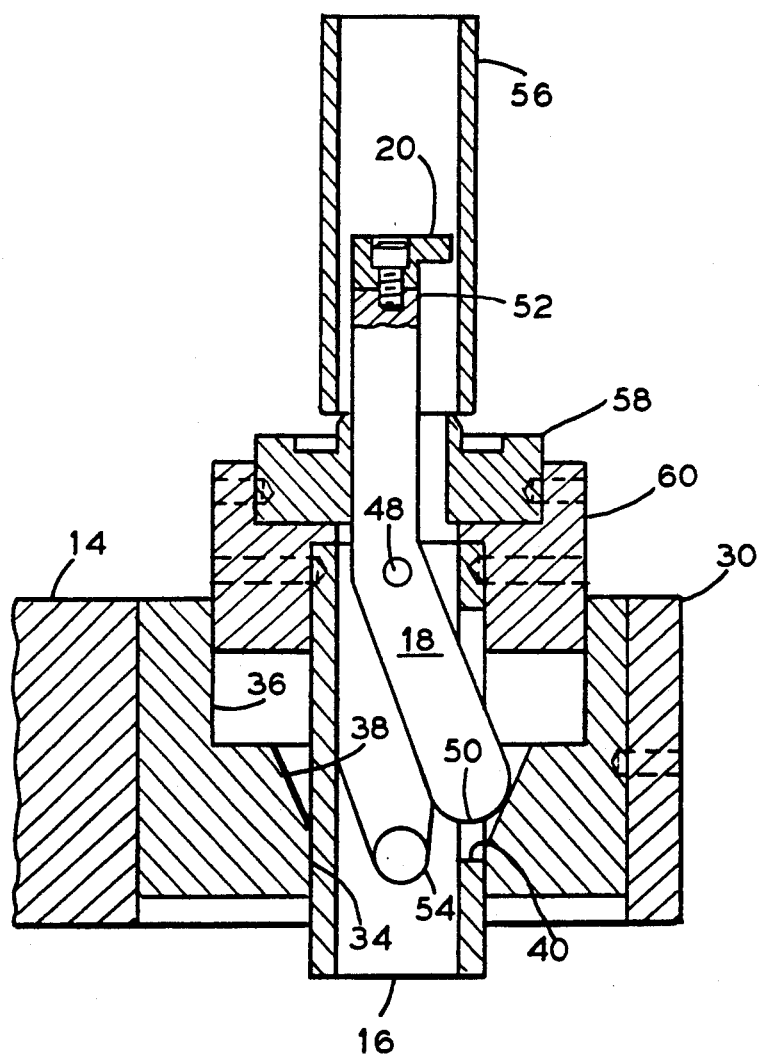
FIG. 3 is an enlarged detail view of the circled area in FIG. 1.

Referring to the drawings, it is seen in FIGS. 1-3 that the invention is generally indicated by the numeral 10. Electrical discharge machining apparatus 10 is generally comprised of support base 12, cam arm 14, sleeve 16, electrode holder 18, electrode 20, means 22 for rotating sleeve 16 and electrode holder 18, and means 24 for causing vertical movement of cam arm 14.

As seen in FIGS. 1 and 2, means 24 for causing vertical movement of cam arm 14 is mounted on the side of support base 12. Means 24 may be formed from any suitable apparatus such as a hydraulic or pneumatic cylinder that serves to selectively control the movement of piston rod 26. Means 24 is controlled by any suitable hydraulic or pneumatic source not shown.

Cam arm 14, seen in the top view of FIG. 2, has first and second ends 28, 30. First end 28 is provided with a bore therethrough for receiving piston rod 26. Nut 32 is used to secure first end 28 to piston rod 26. As best seen in FIG. 3, second end 30 is provided with bore 34 therethrough. Counterbore 36 is provided in the upper portion of bore 34. Bore 34 is provided with tapered section 38 that tapers outwardly toward counterbore 36. Tapered section 38 provides a camming action in conjunction with vertical movement of cam arm 14 and will be explained below. Bore 34 is sized to rotatably receive sleeve 16.

Sleeve 16 is formed from material suitable for the working environment and is provided with slot 40 near one end. Slot 40 allows one end of electrode holder 18 to extend therethrough and bear against tapered section 38. Sleeve 16 is attached to pulley 42 seen in FIG. 2. Pulley 42 is driven by drive belt 44 which is driven by drive wheel 46. Drive wheel 46 is driven by means 22 for rotating sleeve 16 and electrode 18. Means 22 may be formed from any suitable drive motor and drive wheel. Means 22, pulley 42 and supporting hardware for sleeve 16 are mounted on one end of support base 12.

As best seen in FIG. 3, electrode holder 18 is bent and pivotally mounted near its midsection adjacent the end of sleeve 16 on pivot pin 48 so as to be movable between a first normal nonworking position and a second working position. The lower or first end 50 of electrode holder 18 protrudes through slot 40 in sleeve 16 and the upper or second 52 of electrode holder 18 has electrode 20 mounted thereon. Torsion spring 54 mounted in sleeve 16 bears against first end 50 to cause electrode holder 18 to move towards its normal nonworking position in the absence of any external pressures. Electrode holder 18 is inserted into or removed from a workpiece 56 such as a tube while in its first normal nonworking position. In this first position, the end of electrode 20 is held away from the surface of the workpiece. When electrode holder 18 is moved into its second working position, electrode 20 is moved into close proximity to the surface of workpiece 56 so that the electrical arc discharge from electrode 20 may be used to cut or groove workpiece 56.

Movement of electrode holder 18 into its second working position is accomplished by upward vertical movement of cam arm 14. As cam arm 14 is moved upward, the narrower portion of tapered surface 38 causes movement of first end 50 toward the center of sleeve 16 and corresponding movement of second end 52 and electrode 20 toward the surface of workpiece 56 against the force of torsion spring 54. Rotation of sleeve 16 causes corresponding rotation of electrode 20 and allows for a circumferential cut or groove to be made in workpiece 56. Guide bearing 58 and guide bearing race 60 are provided for smooth rotation of sleeve 16. Guide bearing race 60 is received in counterbore 36.

In operation, support base 12 is positioned adjacent equipment or workpieces that are to be cut or grooved by the use of electrical discharge machining. Electrode holder 18 and electrode 20 are moved to the desired position inside workpiece 56 by the use of adjustable slides 62 on support base 12. Electrode 20 is electrically charged from a source not shown. Means 22 is activated to cause rotation of sleeve 16 which in turn rotates electrode holder 18 and electrode 20. Means 24 is used to cause upward movement of cam arm 14 a predetermined distance. This causes electrode holder 18 to move from its first normal nonworking position to its second working position where electrode 20 is in close proximity to workpiece 56. The electrical arc discharge between electrode 20 and workpiece 56 causes removal of material from workpiece 56. The time of the operation is selected to correspond to the desired effect on workpiece 56, that is either cutting a groove or cutting completely through workpiece 56. After the desired result is achieved, the power to electrode 20 is cut, cam arm 14 is lowered to allow electrode holder to move to its first normal nonworking position, and rotation of sleeve 16 is stopped. Adjustable slides 62 are then used to remove electrode holder 18 and electrode 20 from workpiece 56. During the operation, material removed from workpiece 56 travels down the inside of sleeve 16 and may be directed to a suitable collection facility from the lower end of sleeve 16.

What is claimed as invention is:

1. An electrical discharge machining apparatus, comprising:
   a. a support base;
   b. a cam arm;
   c. means mounted on said support base and receiving one end of said cam arm for causing vertical movement of said cam arm;
   d. a sleeve rotatably received in the opposing end of said cam arm;
   e. means mounted on said support base for causing rotation of said sleeve;
   f. an electrode holder pivotally mounted in said sleeve with one end of said electrode holder extending from said sleeve so as to be movable between a first normal nonworking position and a second working position; and
   g. an electrode mounted on one end of said electrode holder.

2. The apparatus of claim 1, further comprising a spring mounted in said sleeve for urging said cam arm toward its first nonworking position.

* * * * *